(12) United States Patent
Takeda et al.

(10) Patent No.: US 12,349,081 B2
(45) Date of Patent: Jul. 1, 2025

(54) TECHNIQUES FOR ENERGY HEADROOM REPORT (EHR) AND SUSTAINABLE DUTY CYCLE (SDC) REPORTING FOR DYNAMIC POWER AGGREGATION

(71) Applicant: QUALCOMM Incorporated, San Diego, CA (US)

(72) Inventors: Kazuki Takeda, Tokyo (JP); Gokul Sridharan, Sunnyvale, CA (US); Timo Ville Vintola, San Diego, CA (US); Gene Fong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/711,714

(22) Filed: Apr. 1, 2022

(65) Prior Publication Data

US 2023/0319735 A1  Oct. 5, 2023

(51) Int. Cl.
*H04B 7/185* (2006.01)
*H04W 52/14* (2009.01)
*H04W 52/36* (2009.01)
*H04W 76/15* (2018.01)

(52) U.S. Cl.
CPC ....... *H04W 52/365* (2013.01); *H04W 52/146* (2013.01); *H04W 76/15* (2018.02)

(58) Field of Classification Search
CPC . H04W 52/365; H04W 52/146; H04W 76/15; H04W 52/50
USPC .......................................................... 370/318
See application file for complete search history.

(56) References Cited

U.S. PATENT DOCUMENTS

| | | | | |
|---|---|---|---|---|
| 8,095,620 B2* | 1/2012 | Rom | ...................... | H04L 47/765 |
| | | | | 709/217 |
| 8,837,381 B2* | 9/2014 | Englund | ............... | H04L 1/0026 |
| | | | | 370/252 |
| 9,264,994 B2* | 2/2016 | Lee | ......................... | H04L 1/0009 |
| 9,549,326 B2* | 1/2017 | Wei | ......................... | H04W 28/20 |
| 9,698,881 B2* | 7/2017 | Nammi | ............... | H04B 7/0479 |
| 9,813,926 B2* | 11/2017 | Li | ......................... | H04W 72/542 |
| 9,907,083 B2* | 2/2018 | Ma | ..................... | H04W 72/0446 |

(Continued)

OTHER PUBLICATIONS

International Search Report and Written Opinion—PCT/US2023/064561—ISA/EPO—Jun. 15, 2023.

(Continued)

*Primary Examiner* — Amancio Gonzalez
(74) *Attorney, Agent, or Firm* — Arent Fox, LLP

(57) ABSTRACT

Aspects described herein relate to energy headroom report (EHR) and sustainable duty cycle (SDC) reporting for dynamic power aggregation. In one example, a user equipment (UE) may identify an available energy or available time period for an uplink transmission via uplink carrier aggregation or dual connectivity. The UE may further transmit, to a network entity, a report including the available energy or available time period for uplink transmission. In another example, a network entity may transmit a configuration message to configure the UE with carrier aggregation or dual connectivity. The network entity may further receive a report including the available energy or time for uplink transmission via carrier aggregation or dual connectivity. The network entity may further adjust uplink communication with the UE based on the received report.

30 Claims, 12 Drawing Sheets

(56) References Cited

U.S. PATENT DOCUMENTS

| | | | |
|---|---|---|---|
| 10,110,355 B2* | 10/2018 | Belghoul | H04L 5/001 |
| 10,270,570 B2* | 4/2019 | Liu | H04L 5/0078 |
| 10,530,327 B2* | 1/2020 | Ruby | H03H 9/64 |
| 10,588,079 B2* | 3/2020 | Wang | H04W 52/0206 |
| 10,630,410 B2* | 4/2020 | Parkvall | H04B 7/0452 |
| 10,694,460 B2* | 6/2020 | Ingale | H04W 68/005 |
| 10,742,562 B2* | 8/2020 | Si | H04W 72/23 |
| 10,999,741 B2* | 5/2021 | Hu | H04W 16/14 |
| 11,039,357 B2* | 6/2021 | Park | H04W 36/00838 |
| 11,071,057 B2* | 7/2021 | Eleftheriadis | H04W 52/0206 |
| 11,290,139 B1* | 3/2022 | Marupaduga | H04W 24/02 |
| 11,304,152 B2* | 4/2022 | Krenz | H04W 52/367 |
| 11,382,115 B2* | 7/2022 | Kim | H04W 74/0808 |
| 11,659,402 B2* | 5/2023 | Bhattacharjee | H04W 72/0446 370/329 |
| 11,689,267 B2* | 6/2023 | Tsai | H04B 7/0626 370/329 |
| 11,758,439 B2* | 9/2023 | Freda | H04W 28/0289 370/229 |
| 11,785,649 B2* | 10/2023 | Li | H04W 74/0808 370/329 |
| 11,800,490 B2* | 10/2023 | Freda | H04W 72/02 |
| 11,924,877 B2* | 3/2024 | Kim | H04W 74/0808 |
| 12,041,535 B2* | 7/2024 | Menon | H04W 48/18 |
| 12,058,734 B2* | 8/2024 | Lu | H04W 72/04 |
| 12,120,661 B2* | 10/2024 | He | H04W 72/0446 |
| 12,120,699 B2* | 10/2024 | Hu | H04W 72/1268 |
| 12,127,044 B2* | 10/2024 | Freda | H04W 28/26 |
| 2018/0007643 A1* | 1/2018 | Tiirola | H04W 52/262 |
| 2021/0037564 A1* | 2/2021 | Futaki | H04W 16/14 |
| 2021/0144652 A1 | 5/2021 | Gheorghiu et al. | |
| 2021/0194654 A1* | 6/2021 | Zhang | H04L 5/0007 |
| 2021/0392534 A1* | 12/2021 | Kim | H04W 74/004 |
| 2022/0124800 A1* | 4/2022 | Shi | H04W 74/004 |
| 2022/0131725 A1* | 4/2022 | Li | H04L 5/0092 |
| 2022/0201758 A1* | 6/2022 | Wang | H04W 36/06 |
| 2022/0256519 A1* | 8/2022 | Jeon | G01S 7/0235 |
| 2022/0264486 A1* | 8/2022 | Hu | H04W 52/146 |
| 2022/0346127 A1* | 10/2022 | Shah | H04W 72/1268 |
| 2022/0400396 A1* | 12/2022 | Alfarhan | H04W 74/0808 |
| 2023/0009559 A1* | 1/2023 | Wang | H04B 7/0695 |
| 2023/0164598 A1* | 5/2023 | Yao | H04W 24/04 370/252 |
| 2023/0171745 A1* | 6/2023 | Ghanbarinejad | H04W 76/19 370/329 |
| 2023/0189092 A1* | 6/2023 | Wang | H04W 76/19 370/331 |
| 2023/0189112 A1* | 6/2023 | Wu | H04W 36/00837 455/437 |
| 2023/0276291 A1* | 8/2023 | Ibrahim | H04W 76/19 370/328 |
| 2023/0309142 A1* | 9/2023 | Tooher | H04W 74/0808 |
| 2023/0345532 A1* | 10/2023 | Khirallah | H04W 74/0816 |
| 2023/0362815 A1* | 11/2023 | Zhao | H04W 76/28 |
| 2024/0147288 A1* | 5/2024 | Huang | H04B 17/24 |
| 2024/0147471 A1* | 5/2024 | Islam | H04W 72/51 |
| 2024/0155589 A1* | 5/2024 | Davydov | H04W 72/232 |
| 2024/0179742 A1* | 5/2024 | Kim | H04W 24/10 |
| 2024/0188097 A1* | 6/2024 | Wang | H04W 72/232 |
| 2024/0236990 A1* | 7/2024 | Li | H04W 72/232 |
| 2024/0251440 A1* | 7/2024 | Centonza | H04W 16/14 |
| 2024/0297771 A1* | 9/2024 | Li | H04B 17/328 |
| 2024/0298350 A1* | 9/2024 | Alfarhan | H04W 72/25 |
| 2024/0322947 A1* | 9/2024 | Xiong | H04L 1/08 |
| 2024/0323959 A1* | 9/2024 | Sengupta | H04W 4/06 |

OTHER PUBLICATIONS

Qualcomm Incorporated: "Rel-16 RF Exposure Compliance Mitigation Techniques", 3GPP TSG-RAN WG4 Meeting #90, R4-1900448, 3rd Generation Partnership Project, Mobile Competence Centre, 650, Route Des Lucioles, F-06921 Sophia-Antipolis Cedex, FRA, vol. RAN WG4, No. Athens, Greece, Feb. 25, 2019-Mar. 1, 2019, Feb. 15, 2019, 4 Pages, XP051605217, paragraphs [2.1.1], [2.1.2], [02.2], [02.3], [Conclusions].

* cited by examiner

TECHNIQUES FOR ENERGY HEADROOM REPORT (EHR) AND SUSTAINABLE DUTY CYCLE (SDC) REPORTING FOR DYNAMIC POWER AGGREGATION

TECHNICAL FIELD

Aspects of the present disclosure relate generally to wireless communication systems, and more particularly, for energy headroom report (EHR) and sustainable duty cycle (SDC) reporting for dynamic power aggregation.

DESCRIPTION OF RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, specifically, carrier aggregation allows for aggregating several frequency bands for higher peak rates and increased cell coverage. However, a UE may not optimally utilize transmit power during uplink transmissions via carrier aggregation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method may include identifying an available energy or available time period for an uplink transmission via uplink carrier aggregation or dual connectivity. The method may further include transmitting, to a network entity, a report including the available energy or available time period for uplink transmission.

In a further example, an apparatus for wireless communication including a transceiver, a memory configured to store instructions, and at least one processor communicatively coupled with the transceiver and the memory, where the at least one processor may be configured to identify an available energy or available time period for an uplink transmission via uplink carrier aggregation or dual connectivity. The at least one processor may further be configured to transmit, to a network entity, a report including the available energy or available time period for uplink transmission.

In a further example, a non-transitory computer-readable medium includes code executable by at least one processor to identify an available energy or available time period for an uplink transmission via uplink carrier aggregation or dual connectivity. The non-transitory computer-readable medium further includes code executable by at least one processor to transmit, to a network entity, a report including the available energy or available time period for uplink transmission.

In a further example, an apparatus for wireless communication may include means for identifying an available energy or available time period for an uplink transmission via uplink carrier aggregation or dual connectivity. The apparatus may further include means for transmitting, to a network entity, a report including the available energy or available time period for uplink transmission.

According to another example, a method of wireless communication at a network entity is provided. The method may include transmitting, to a UE, a configuration message to configure the UE with carrier aggregation or dual connectivity. The method may further include receiving, from the UE, a report including the available energy or time for uplink transmission via carrier aggregation or dual connectivity. The method may further include adjusting uplink communication with the UE based on the received report.

In a further example, an apparatus for wireless communication including a transceiver, a memory configured to store instructions, and at least one processor communicatively coupled with the transceiver and the memory, where the at least one processor may be configured to transmit, to a UE, a configuration message to configure the UE with carrier aggregation or dual connectivity. The at least one processor is further configured to receive, from the UE, a report including the available energy or time for uplink transmission via carrier aggregation or dual connectivity. The at least one processor is further configured to adjust uplink communication with the UE based on the received report.

In a further example, a non-transitory computer-readable medium includes code executable by at least one processor to transmit, to a UE, a configuration message to configure the UE with carrier aggregation or dual connectivity. The non-transitory computer-readable medium includes code executable by at least one processor to receive, from the UE, a report including the available energy or time for uplink transmission via carrier aggregation or dual connectivity. The non-transitory computer-readable medium includes code executable by at least one processor to adjust uplink communication with the UE based on the received report.

In a further example, an apparatus for wireless communication may include means for transmitting, to a UE, a configuration message to configure the UE with carrier aggregation or dual connectivity. The apparatus may further include means for receiving, from the UE, a report including the available energy or time for uplink transmission via carrier aggregation or dual connectivity. The apparatus may further include means for adjusting uplink communication with the UE based on the received report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1A:
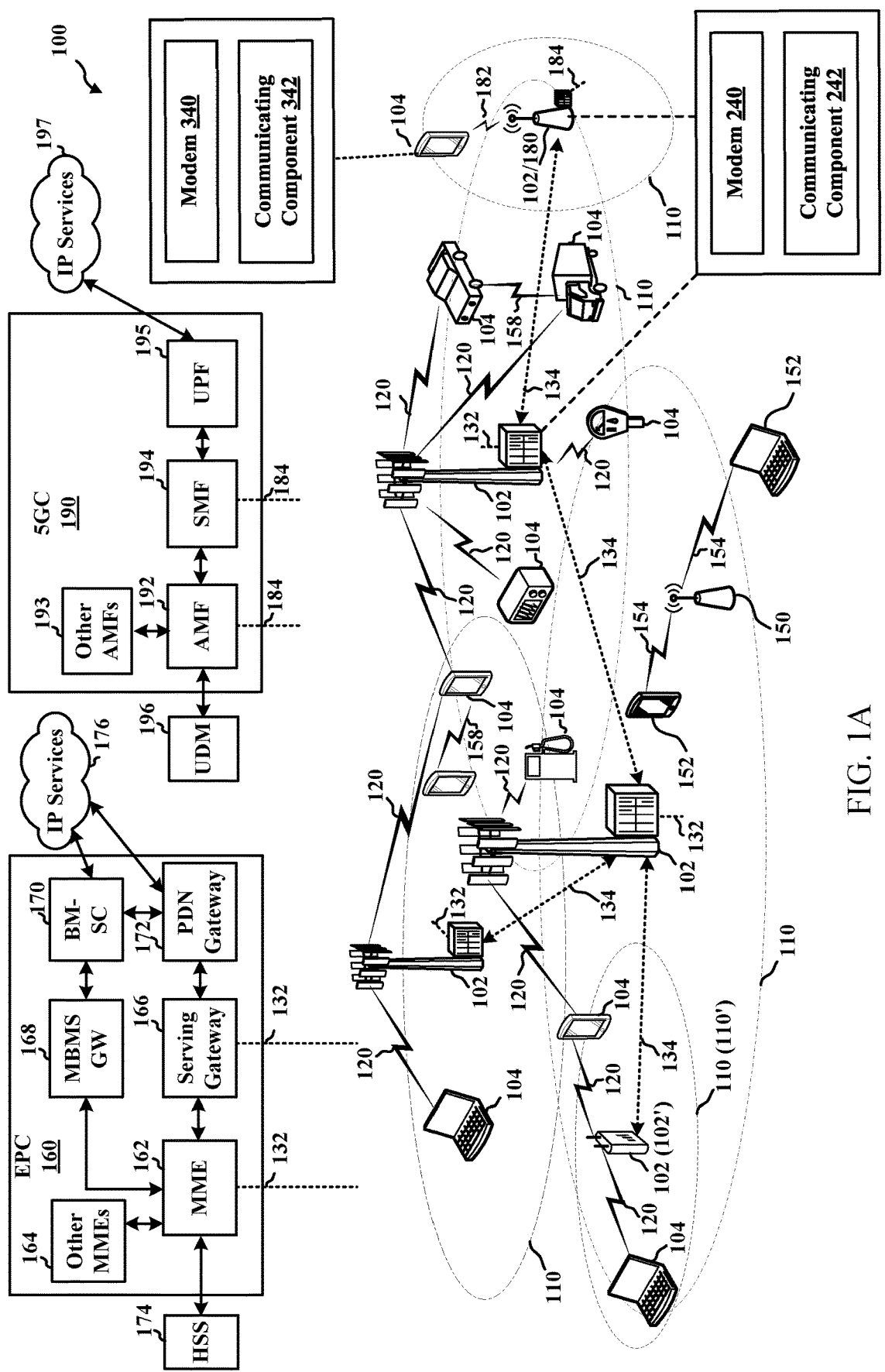
FIG. 1A illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to energy headroom report (EHR) and sustainable duty cycle (SDC) reporting for dynamic power aggregation. For example, a sustainable duty cycle, which may also be referred to as a dynamic duty cycle or a maximum uplink duty cycle, may correspond to an allocated time for transmission on a defined carrier or band. A user equipment (UE) may report a maximum uplink duty cycle as part of a power headroom report (PHR). The maximum uplink duty cycle may be valid for the next 'X' period (e.g., in seconds) starting from a reference slot (e.g., the slot or the next slot the report was sent). From a network perspective, in the case a new PHR report with a new duty cycle may not be available after validity period 'X' is reached, the same duty cycle may be assumed for the next validity period until a new duty cycle information is available from the UE. From a UE perspective, the UE may not report an SDC if the SDC in a next period remains unchanged as that in a previous period. If the network assigns uplink grants that violate the reported sustainable duty cycle, the UE may drop or disregard the uplink grants, or may transmit according to the grant, but at a reduced power level. That is, the UE may reduce the transmit power in the event the network assignments violates the reported sustainable duty cycle.

Dynamic energy headroom may indicate a remaining amount of energy at a UE for data transmissions compared to an available energy, where the consumed energy is equal to the available energy minus the remaining amount of energy is the integral of transmit power over a particular time period. A UE reports a maximum remaining uplink energy as part of PHR report. The remaining energy may be reported relative to a power headroom, e.g., UE may report for a given transmission a corresponding power headroom and a remaining energy compared to full power transmissions based on zero power headroom transmissions and an uplink duty cycle according to the reported 'maxUplinkDutyCycle' capability. The remaining uplink energy may be valid for a next 'X' period (e.g., in seconds) starting after the slot the report was sent. In the case a new PHR report with an updated remaining uplink energy is not available after the validity period 'X' has been reached, the same remaining uplink energy may be assumed for the next validity period until the remaining uplink energy information is available from the UE. If the network assigns uplink grants that violate the reported remaining uplink energy, the UE may forgo or scale down the uplink transmission according to the uplink grants.

Specifically, a UE may implement carrier aggregation to utilize multiple frequency bands or component carriers to increase data rates on an uplink or downlink channel. As part of carrier aggregation, a UE may perform power aggregation in order to increase a total transmit power, for example, during uplink transmissions. For example, uplink dynamic power aggregation may enable an increase in instantaneous transmit power without resulting in an average transmit power exceeding a maximum total transmit power threshold. However, the instantaneous power allocation of a UE may adjust the instantaneous power for average power compliance, which may be viewed as unpredictable behavior from a network perspective.

As such, to better indicate available power resources at a UE, the present implementations provide improved uplink transmission power allocation. For example, in one aspect, a UE may identify an available energy or available time period for an uplink transmission via uplink carrier aggregation or dual connectivity. The UE may further transmit, to a network entity such as a base station, a report including the available energy or available time period for uplink transmission. In another aspect, a network entity may transmit, to a UE, a configuration message to configure the UE with carrier aggregation or dual connectivity. The network entity may further receive, from the UE, a report including the available energy or time for uplink transmission via carrier aggregation or dual connectivity. The network entity may further adjust uplink communication with the UE based on the received report.

Particular implementations of the subject matter described in this disclosure can be implemented to realize one or more of the following potential advantages. The disclosed techniques increase uplink transmission performance. Further, a network entity may identify a remaining energy or time for uplink transmissions until a limit of the compliance and adjust an amount of uplink scheduling accordingly using the available energy reports received from UEs. Specifically, the techniques described herein may provide a flexible approach that enables a UE to use power aggregation across two or more carriers or bands in an instantaneous manner without increasing a permitted average transmit power. Further, the present techniques provide improved visibility into the available remaining power resources at the UE for uplink transmissions.

The described features will be presented in more detail below with reference to FIGS. 1A-B, 2, 3, 4A-E, and 5-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1A is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as UE 104 of the wireless communication system may have a modem 240 and communicating component 242 for EHR and SDC reporting for dynamic power aggregation, as described herein. Though a UE 104 is shown as having the modem 240 and communicating component 242, this is one illustrative example, and substantially any node or type of node may include a modem 240 and communicating component 242 for providing corresponding functionalities described herein.

In another example, some nodes and/or network entities such as base station 102/gNB 180, may have a modem 340 and communicating component 342 for EHR and SDC reporting for dynamic power aggregation, as described herein. Though a base station 102/gNB 180 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a AMF 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station 102 and/or 180 may also be referred to as a network device, a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 1B:
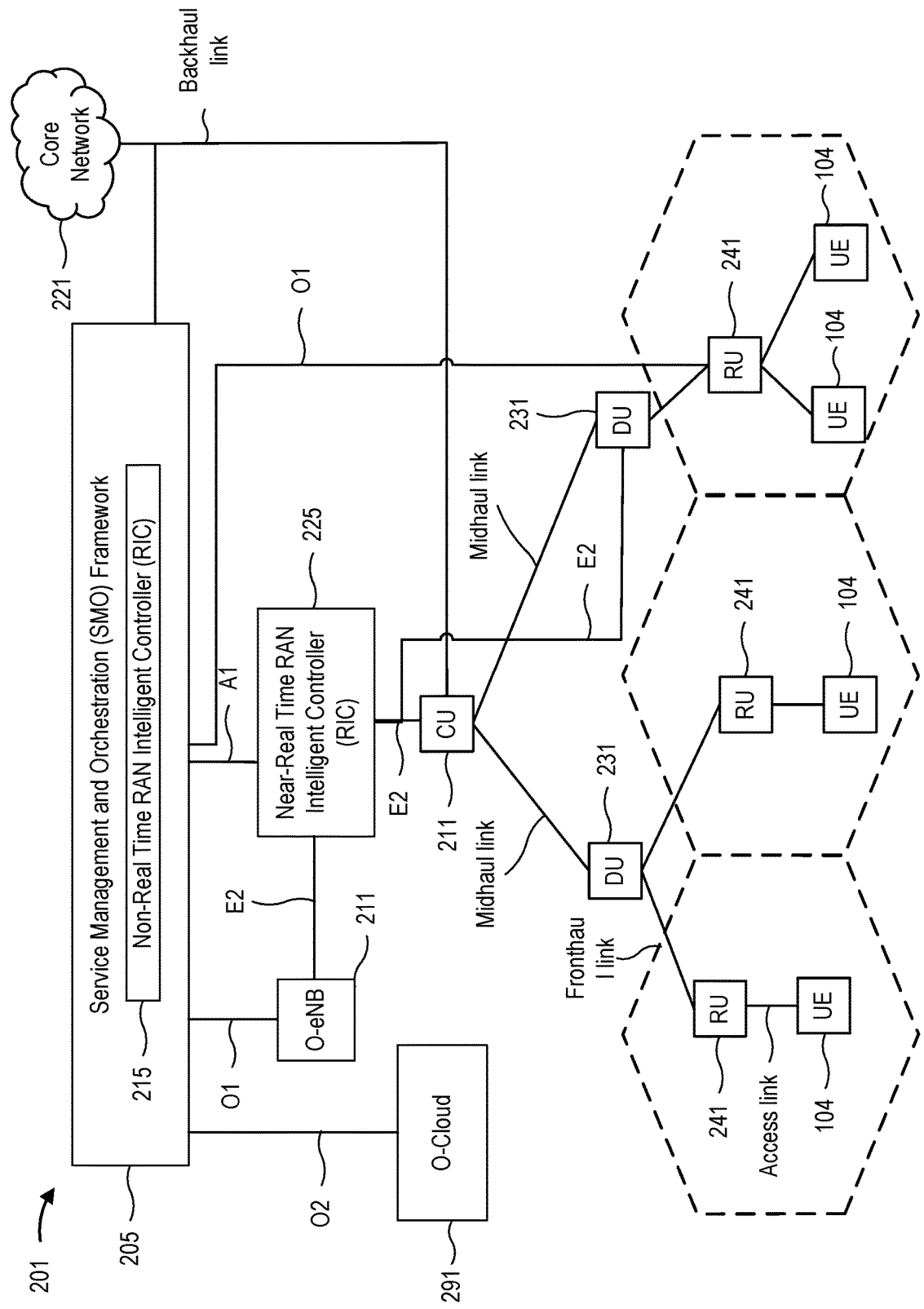
FIG. 1B is a diagram illustrating an example of disaggregated base station architecture, in accordance with various aspects of the present disclosure.

FIG. 1B shows a diagram illustrating an example of disaggregated base station 201 architecture, any one or combination of elements of which may be one example implementation of base station 102 and/or base station 180 (see FIG. 1A) or, more generally, a network device. The disaggregated base station 201 architecture may include one or more central units (CUs) 211 that can communicate directly with a core network 221 via a backhaul link, or indirectly with the core network 221 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 104 via one or more radio frequency (RF) access links. In some implementations, the UE 104 may be simultaneously served by multiple RUs 241.

Each of the units, e.g., the CUs 211, the DUs 231, the RUs 241, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (e.g., Central Unit—User Plane (CU—UP)), control plane functionality (e.g., Central Unit—Control Plane (CU—CP)), or a combination thereof. In some implementations, the CU 211 can be logically split into one or more CU—UP units and one or more CU—CP units. The CU—UP unit can communicate bidirectionally with the CU—CP unit via an interface, such as the E1 interface when implemented in an O-RAN configuration. The CU 211 can be implemented to communicate with the DU 231, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 104. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 241 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 211, one or more DUs 231, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
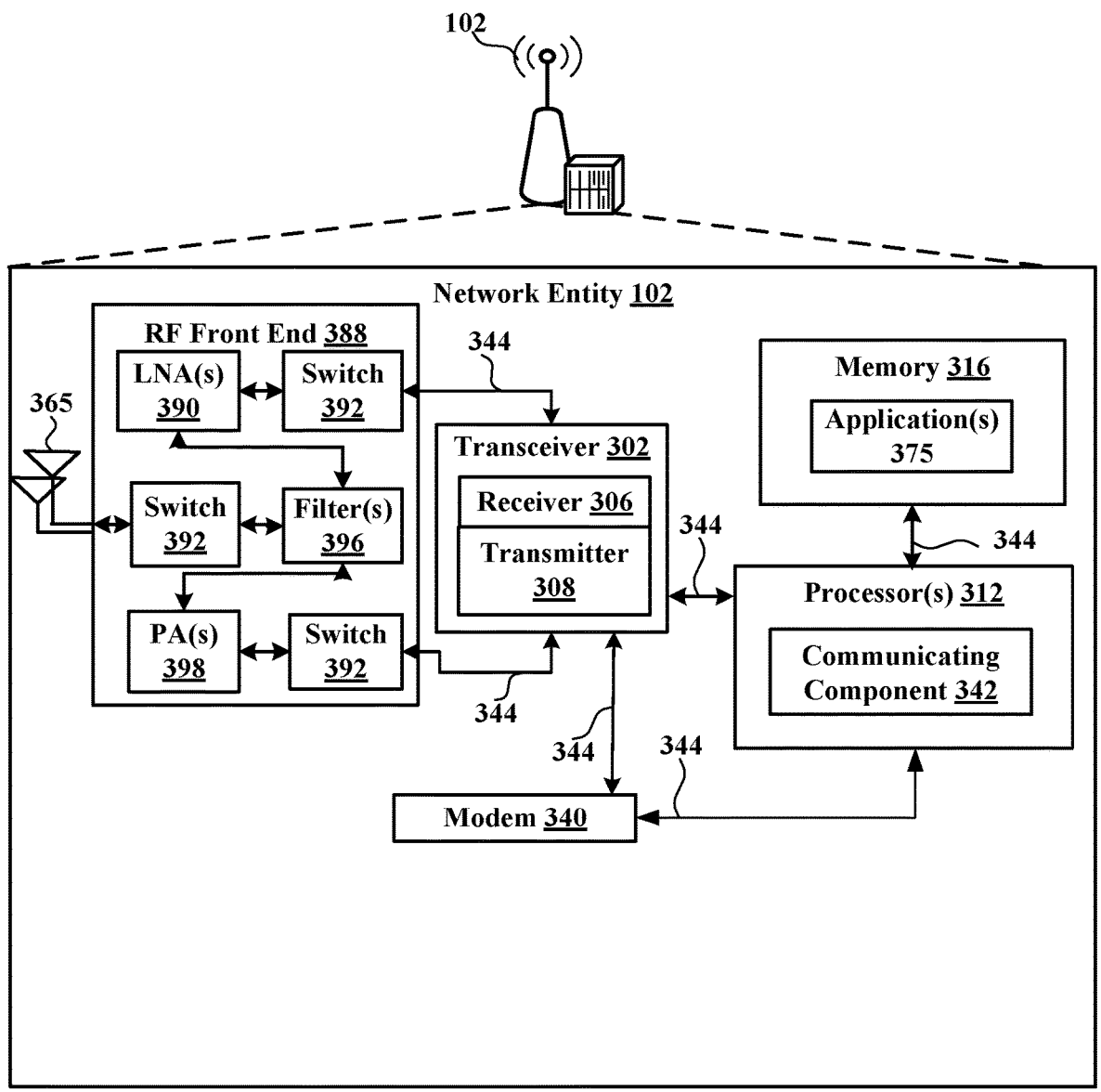
FIG. 3 is a block diagram illustrating an example of a network entity (also referred to as a base station), in accordance with various aspects of the present disclosure.
Figure 4A:
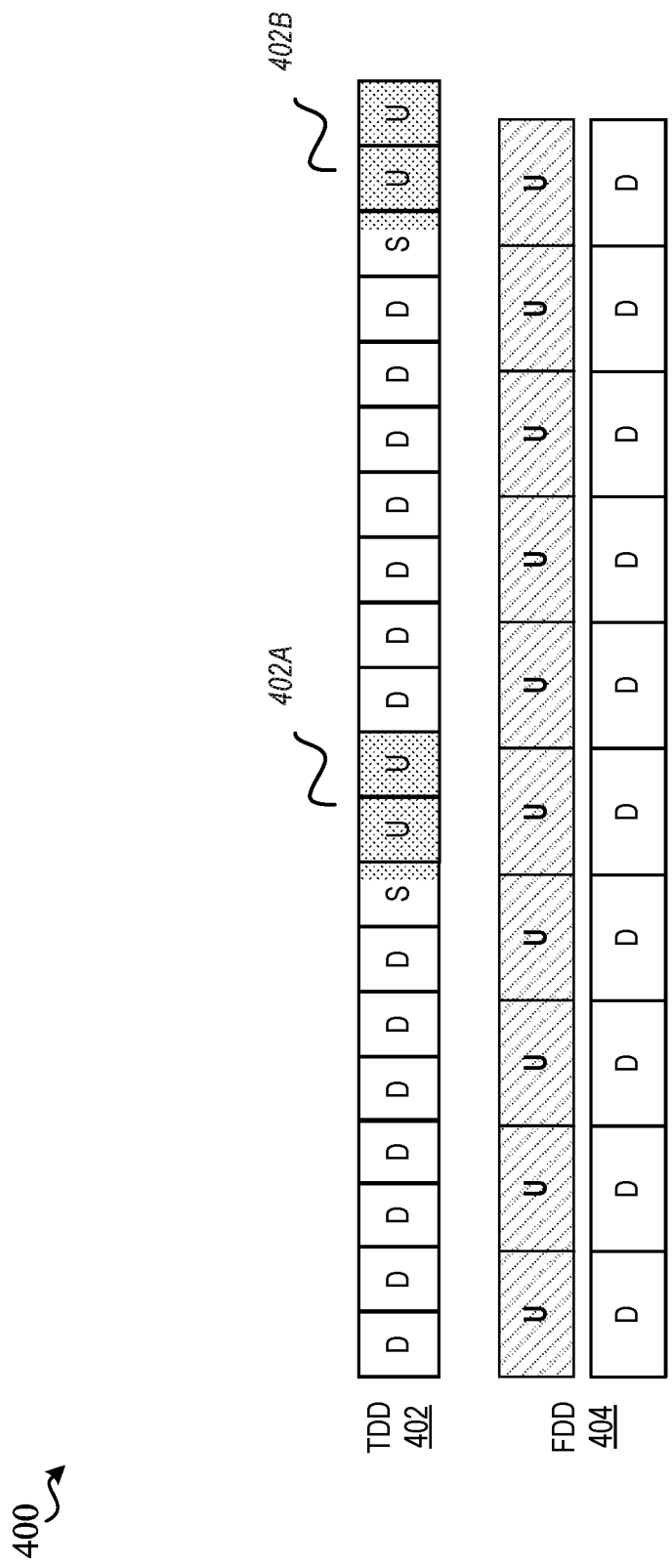
FIG. 4A is a diagram of time division duplex (TDD) based power aggregation and frequency division duplex (FDD) based power aggregation, in accordance with various aspects of the present disclosure.
Figure 4B:
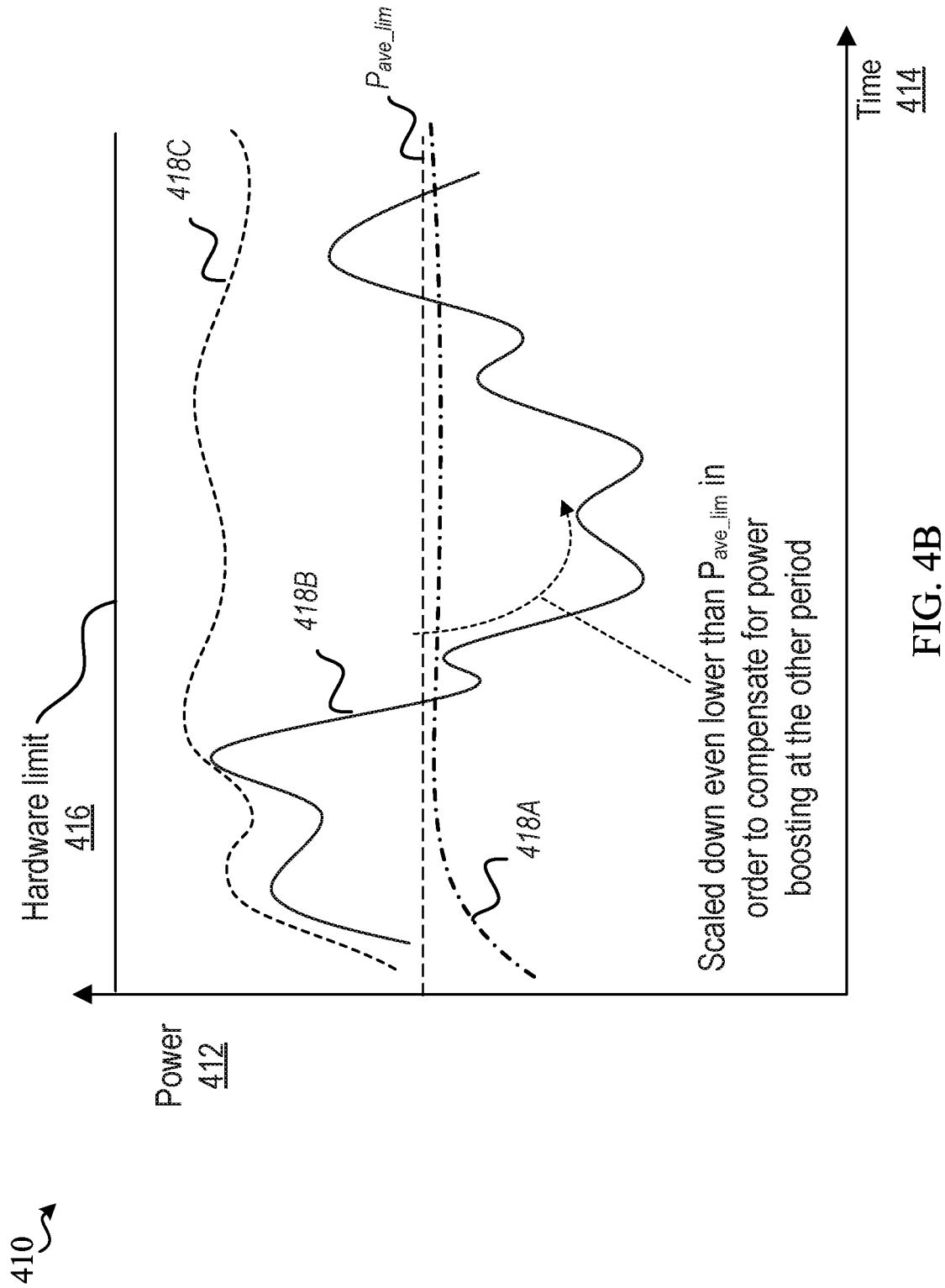
FIG. 4B is a graph of various UE power metrics mapped over time during carrier aggregation, in accordance with various aspects of the present disclosure.
Figure 4C:
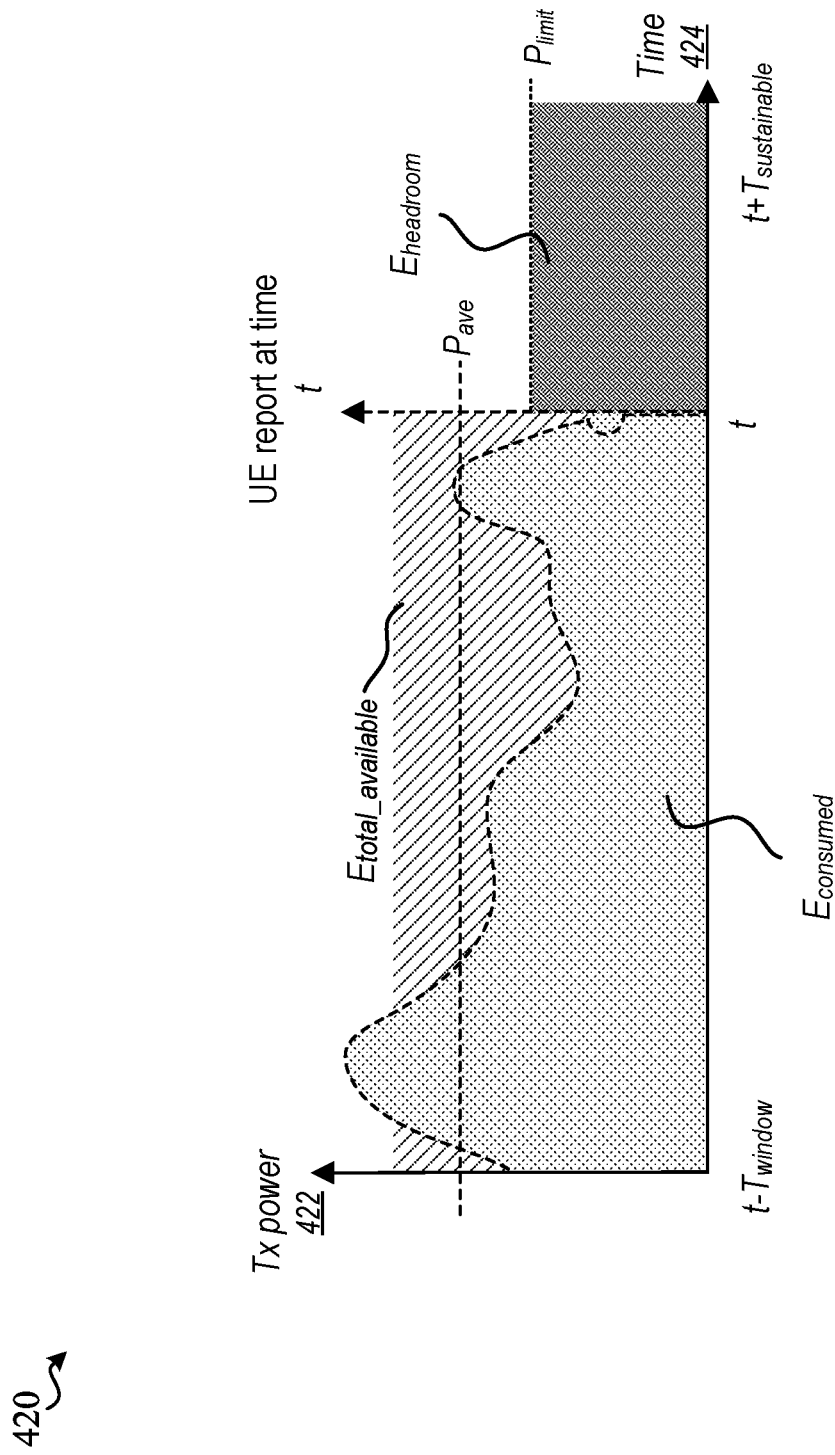
FIG. 4C is a graph showing the transmit power mapped over time for UE reporting of available energy and/or time, in accordance with various aspects of the present disclosure.
Figure 4D:
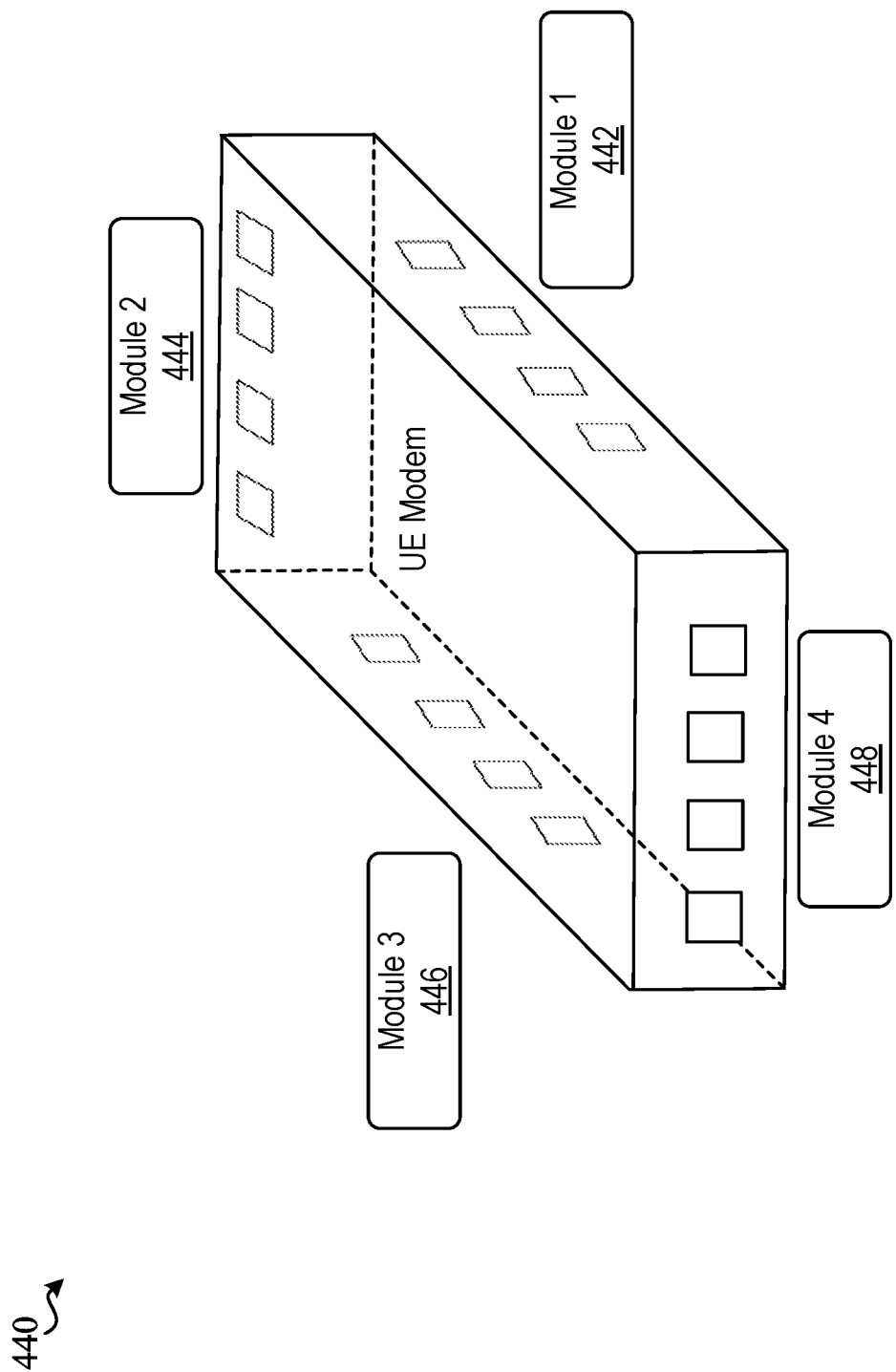
FIG. 4D is a conceptual diagram of multiple radio frequency modules at a UE, in accordance with various aspects of the present disclosure.
Figure 4E:
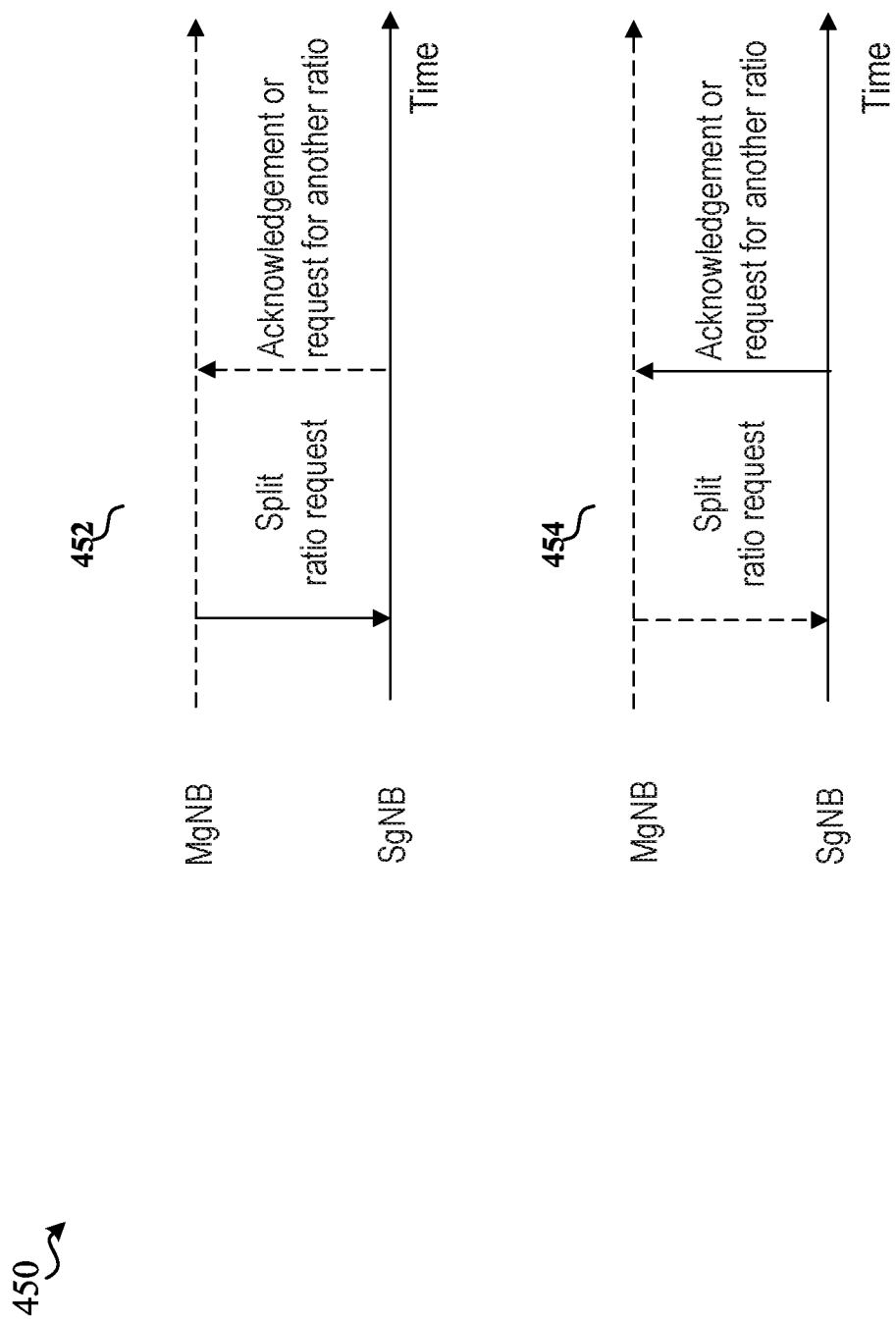
FIG. 4E is a diagram of example communications between two network entities supporting dual connectivity, in accordance with various aspects of the present disclosure.
Figure 5:
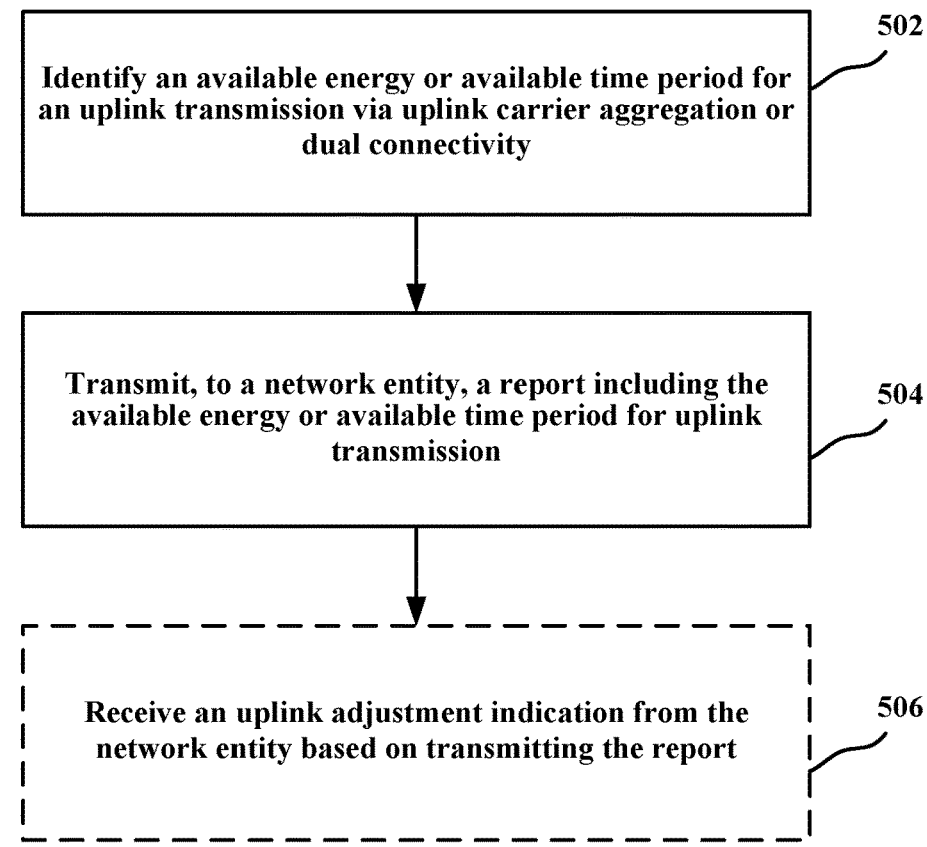
FIG. 5 is a flow chart illustrating an example of a method for wireless communications at a UE in accordance with various aspects of the present disclosure.
Figure 6:
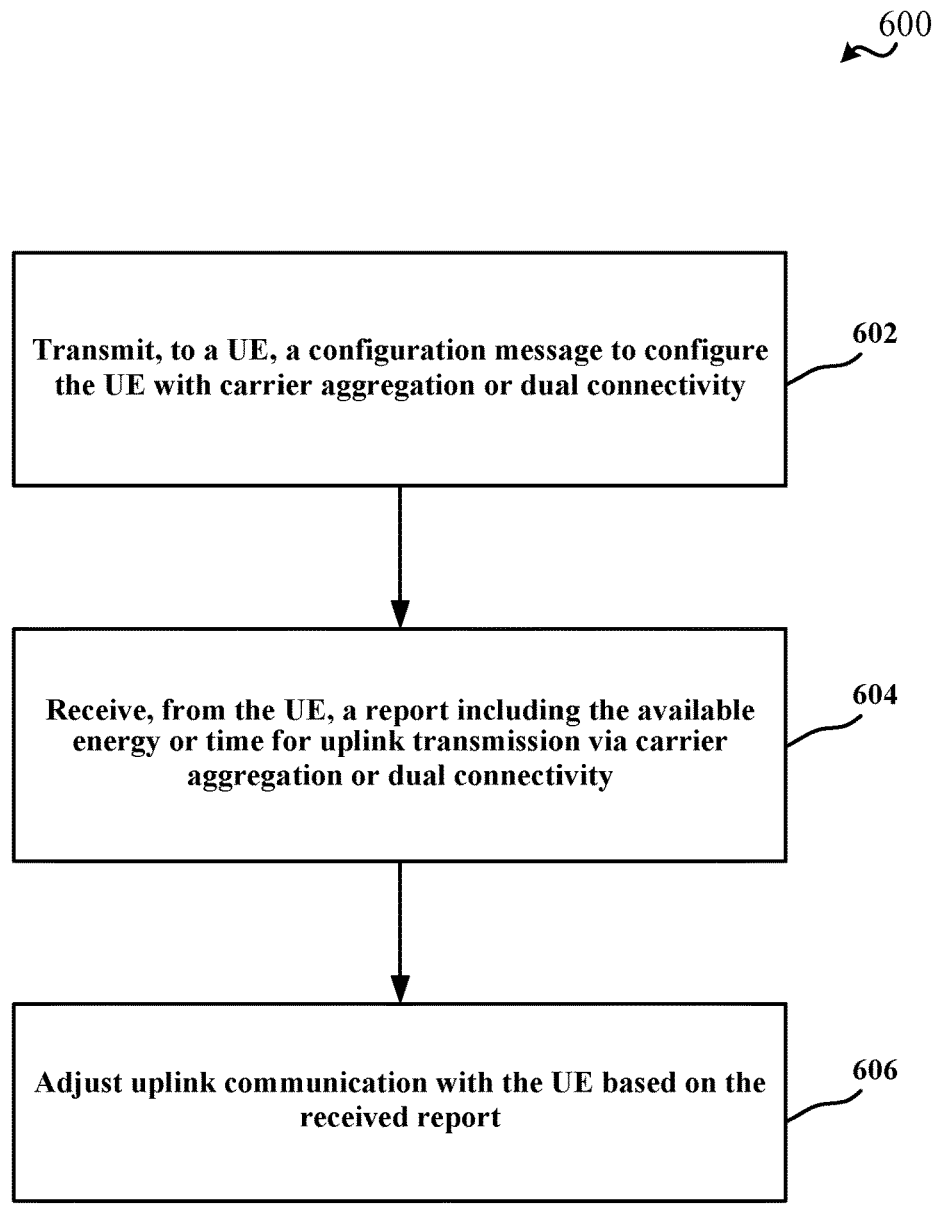
FIG. 6 is a flow chart illustrating another example of a method for wireless communications at a network entity in accordance with various aspects of the present disclosure.

Turning now to FIGS. 2, 3, 4A-E, and 5-7, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
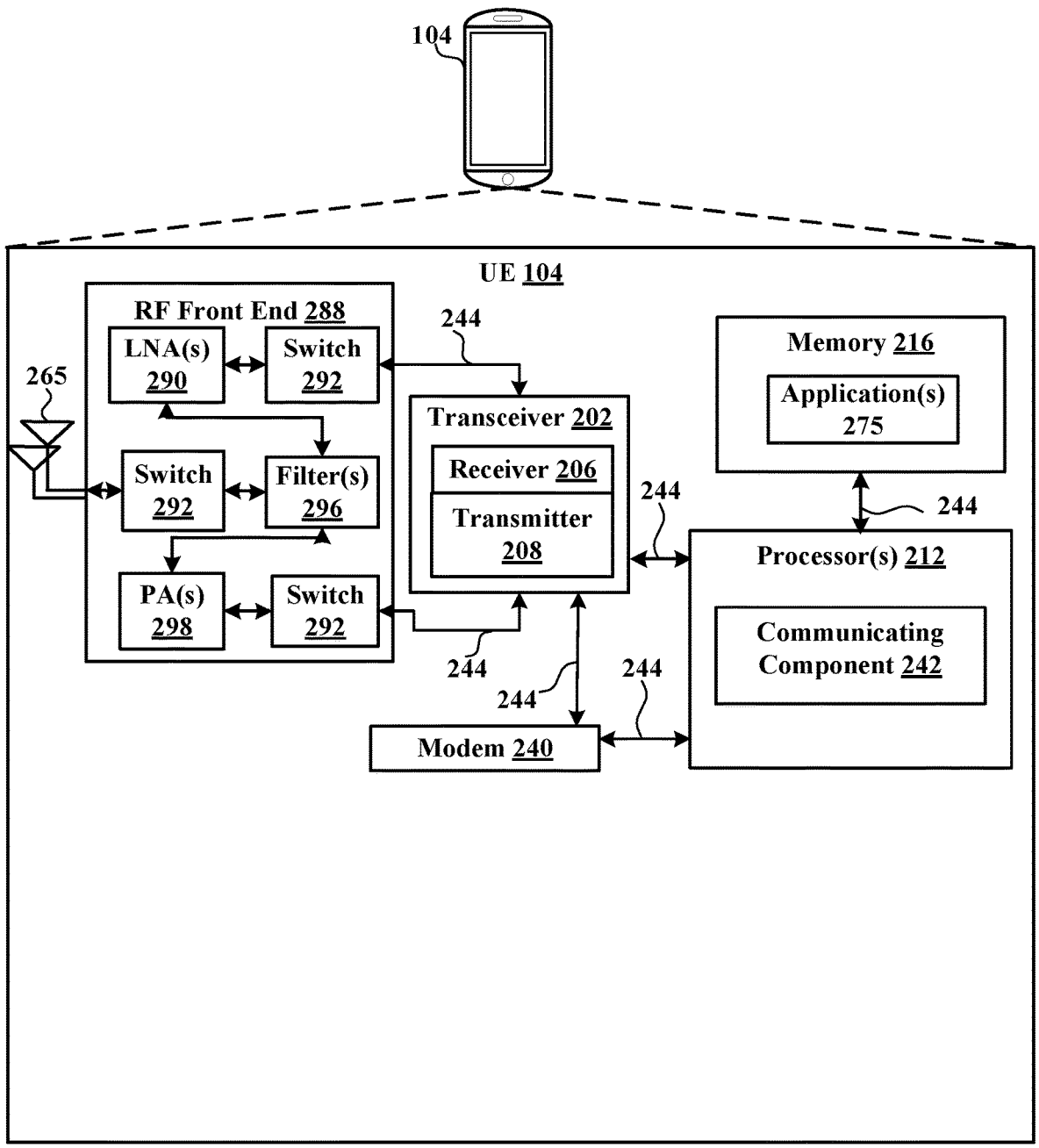
FIG. 2 is a block diagram illustrating an example of a user equipment (UE), in accordance with various aspects of the present disclosure.

Referring to FIG. 2, one example of an implementation of a UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for EHR and SDC reporting for dynamic power aggregation.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF)

receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one UE 104 or wireless transmissions transmitted by base station 102. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of a node or network device, such as base station 102 (e.g., a base station 102 and/or gNB 180, as described above, or even a UE such as in a sidelink communication scenario) may include a variety of components, some of which have already been described above and are described further herein, including components such as one or more processors 312 and memory 316 and transceiver 302 in communication via one or more buses 344, which may operate in conjunction with modem 340 and/or communicating component 342 for identifying a time-scale at which a set of one or more adaptive beam weights for hybrid beamforming communications can be learned.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

FIG. 4A is a diagram of TDD based power aggregation 402 and FDD based power aggregation 404. In one example of TDD-FDD carrier aggregation, the power aggregation for FDD on the uplink may be up to 23 dBm, and the power aggregation for TDD on the uplink may be up to 26 dBm. The UE power class, which may correspond to a max sum power limit may be 26 dBm. More specifically, the sum power may not exceed 26 dBm, and in some cases 23 dBm if an uplink transmission 'T' occupies more than a defined threshold. However, a UE's hardware may be capable of boosting the sum power up to approximately 28 dBm (e.g., 23 dBm+26 dBm). Hence, uplink dynamic power aggregation may enable a UE to transmit with up to 23 dBm+26 dBm without limiting the total by 26 dBm, as long as the specific absorption rate (SAR) and power density (PD) thresholds are satisfied. TDD resources 402A and 402B represent the resources that the UE can transmit on the uplink.

In particular, SAR and PD thresholds represent radio frequency exposures of sub-6 GHz frequencies and above-6 GHz frequencies. These thresholds can be converted into allowable average transmit power over a certain time period (e.g., 30 sec), such that the thresholds can be interpreted as acceptable energy the UE can transmit for Sub-6 GHz frequencies and above-6 GHz frequencies, measured at or proximate a human body.

Additional examples include FDD-FDD CA and TDD-TDD CA. Further, various combinations of power aggregation classes and UE power classes may be implemented. In one example, power aggregation may be permitted for up to 23 dBm for each carrier even though the UE power class corresponds to 23 dBm, with a corresponding hardware limit at 26 dBm. In another example, one power aggregation (e.g., 23 dBm) may be permitted for one carrier, and two power aggregation (e.g., 23 dBm+26 dBm) for another carrier having a hardware limit at 29 dBm.

FIG. 4B is a graph diagram 410 of various UE power metrics mapped over time during carrier aggregation. The graph diagram 410 includes power 412 on a vertical axis and time 414 on a horizontal axis, and the power metrics may include a UE average power metric 418A, a UE transmit power metric 418B, and a UE potential power metric 418C. The potential power metric 418C represents the envelope of possible transmit power if the UE follows uplink scheduling or power control by the network. The UE transmit power metric 418B represents the envelope of actual transmit power the UE transmits. The UE transmit power metric 418B may be reduced compared to the UE potential power metric 418C, since if the UE follows a scheduler or power-control, the UE may not be able to comply with Pave,lim, which may correspond to the average power limit, i.e., power averaged over the time window may be not higher than Pave,lim. Further, a hardware limit 416 may be set with respect to UE transmit power. For example, if the UE implements two power aggregations for uplink carrier aggregation band combination, where a first power aggregation may operate up to 23 dBm and a second power aggregation may operate up to 26 dBm, then the hardware limit for the uplink carrier aggregation may be 27.8 dBm (e.g., 23 dBm+26 dBm).

Uplink dynamic power aggregation may offer opportunities of uplink transmit power boosting by taking advantage of the fact that the UE may not transmit uplink at full power all the time. An average power can be maintained below a threshold level allowing instantaneous power beyond the threshold. On the other hand, the UE's instantaneous power allocation may not be based on the power allocation formula, e.g., the UE may change the instantaneous power for average power compliance, which could be considered as unpredictable behavior from the network point of view. Further, since the gNB may adjust modulation and coding scheme (MCS), MIMO layer and precoder, and bandwidth settings or parameters, based on the available instantaneous power, the unexpected de-boosting of the instantaneous power may result in degraded uplink performance. For uplink carrier aggregation or for dual connectivity, there could be more than one uplink carrier the UE transmits on. As such, reporting of available energy for uplink carrier aggregation or dual connectivity may be desired.

FIG. 4C is a graph 420 showing the transmit power 422 mapped over time 424 for UE reporting of available energy and/or time. As shown, the time between $t-T_{window}$ and $t$ may include the total available energy ($E_{total\_available}$) and the consumed energy ($E_{consumed}$) During that period, the average power (13$a$ye) may be identified. At time t, the UE may transmit a report indicating the remaining or available power for uplink power aggregation. In an aspect, $E_{headroom} = E_{total\_available} - E_{consumed}$, wherein $E_{headroom} = P_{limit} \times T_{sustainable}$ (e.g., a power limit times a sustainable time), wherein $E_{total\_available} = P_{ref} \times T_{window}$ a reference power times a time window), and wherein $E_{consumed} = \int_0^{T_{window}} P(t-x)dx = P_{ave} \times T_{window}$.

In other words, the present implementations support reporting, by a UE, of an available or remaining energy to the network. The network may be able to identify the available or remaining energy the UE can allocate for uplink transmissions. In a first implementation, the report may include available or remaining energy representing an energy headroom report at time t (e.g., $E_{headroom}$). In a second implementation, the report may include time information during which the UE can sustain the transmission with a certain power, e.g., sustainable transmission period, sustainable duty cycle ($T_{sustainable}$). For the second implementation, a defined amount of power may be known by network and UE to share the energy information.

In a first aspect, the UE may transmit a per-carrier or band report to a network entity. Specifically, the report may include or otherwise correspond to an energy headroom report. For uplink carrier aggregation, the UE may report available energy (e.g., $E_{headroom}$) for each uplink carrier or band such that the UE may report multiple of $E_{headroom}$ that correspond to multiple uplink carriers or bands for uplink carrier aggregation. A UE may determine an allocation of the total available energy in sub-6 GHz into multiple uplink carriers or bands of sub-6 GHz to calculate $E_{headroom}$ for each uplink carrier or band of sub-6 GHz, as well as similar techniques for above-6 GHz. The gNB can regenerate the total available energy for sub-6 GHz and separately for above-6 GHz by aggregating the reported multiple of $E_{headroom}$ for multiple uplink carriers in sub-6 GHz and separately for Above-6 GHz. The energy headroom for sub-6 GHz and above 6 GHz may be represented as:

The available energy ($E_{headroom}$) for both sub-6 GHz and above 6 GHz may be reported for each uplink carrier or band.

In a second aspect, the UE may transmit a per-carrier or band report to a network entity. Specifically, the report may include a time period that the UE can sustain transmission with a particular transmission power. For uplink carrier aggregation, the UE may report a sustainable transmission period/duty cycle (e.g., $T_{sustainable}$) for each uplink carrier or band. For example, the UE may report multiple of $T_{sustainable}$ that correspond to multiple UL carriers or bands. The UE may determine the manner by which to split the total available energy in sub-6 GHz into multiple uplink carriers or bands of sub-6 GHz to calculate $T_{sustainable}$ for each uplink carrier or band of sub-6 GHz, e.g., same for above-6 GHz. The gNB can regenerate the total available energy for sub-6 GHz and for above-6 GHz by aggregating the energy calculated by multiple of $T_{sustainable}$. The energy headroom for sub-6 GHz and above 6 GHz may be represented as:

The reference power may be known by both the gNB and UE, and may be a predefined fixed value, e.g., 23 dBm, or preconfigured by RRC signalling. In another example, the reference power may be a dynamically determined value that is reported via a power headroom report (PHR), e.g., $P_{CMAX,n}$, or an actual transmission power when PHR is computed and reported. The sustainable transmission period/duty cycle may be reported for each uplink carrier or band.

In a third aspect, a total report may be transmitted by a UE to a network entity. In one example, for uplink carrier aggregation, the UE may report a total available energy (e.g., $E_{headroom}$) over uplink carriers or bands in sub-6 GHz or above-6 GHz such that one $E_{headroom}$ is identified for sub-6 GHz in total and one $E_{headroom}$ is identified for above-6 GHz in total, if any. In another example, for uplink carrier aggregation, the UE may report a single $T_{sustainable}$ for sub-6 GHz or above-6 GHz such that one $T_{sustainable}$ is identified for sub-6 GHz in total and one $T_{sustainable}$ is identified for above-6 GHz in total. The total energy headroom for sub-6 GHz and above 6 GHz may be represented as:

The reference power to derive $T_{sustainable}$, may be known by both gNB and UE and may not be dependent on a per-carrier or band aspect. For instance, the aforementioned can be a predefined fixed value, e.g., 23 dBm, or preconfigured by RRC signalling.

In a fourth aspect, a total report using a particular carrier or band may be identified by the UE. This aspect may relate to reporting a sustainable duty cycle ($T_{sustainable}$). For uplink carrier aggregation, the UE may report a single $T_{sustainable}$ for sub-6 GHz or above-6 GHz such that one $T_{sustainable}$ may be identified for sub-6 GHz in total and one $T_{sustainable}$ may be identified for above-6 GHz in total, if any. Further, the reference power to derive $T_{sustainable}$ may be a transmit power for a particular carrier or band at an occasion.

For example, the reference power may be a reference transmission power of a particular carrier or band based on the report of a PHR. The PHR may be the one reported together with the $T_{sustainable}$ (e.g., in the same physical uplink shared channel (PUSCH)), or may be the one that has been reported previously (e.g., the latest PHR). The PHR may be the one for a predetermined carrier or band (e.g., primary cell (PCell) or lowest serving cell index), or for a semi-statically configured carrier or band (e.g., serving cell index 'x'), or for a carrier or band where the UE has an actual uplink transmission and the PHR is calculated based on the actual transmission and not based on a reference transmission. The total report using a particular carrier or band for sub-6 GHz and above 6 GHz may be represented as:

The PHR may be based on an actual transmission, e.g., $PHR=P_{cmax,c}-P_{actual}$, where $P_{cmax,c}$ and $P_{actual}$ are the max power for the component carrier and the actual transmission power. The PHR may be based on reference transmission, e.g., $PHR=P_{cmax,c,MPR}=0-P_{reference}$, where $P_{cmax,c,MPR}=0$ is the max power assuming no power backoff due to maximum power reduction (MPR)/Power Management MPR (P-MPR)/Additional MPR (A-MPR) and $P_{reference}$ is the transmission power assuming 1-resource block (RB) PUSCH transmission.

FIG. 4D is a conceptual diagram of multiple radio frequency modules 440 at a UE. For example, a UE modem of UE 104 may be equipped with multiple radio frequency modules for uplink transmission including a first radio frequency module 442, a second radio frequency module 444, a third radio frequency module 446, and a fourth radio frequency module 448.

In a first aspect, the multiple radio frequency modules may be used for uplink transmission for a given carrier or band to enable multi-beam. In a second aspect, the multiple radio frequency modules may be used for uplink transmission for different carriers or bands. Since the energy headroom towards SAR or PD budget could be different for different radio frequency modules, EHR or SDC reporting may be implemented on a per radio frequency module basis. Specifically, a UE may report to the network a number of equipped radio frequency modules and how each of them is used, e.g., for which carrier or band. The UE may be configured with multiple reports of EHR or SDC for the multiple radio frequency modules.

In one example relating to the first aspect, the UE may report multiple EHR or SDC for the same carrier or band for multiple radio frequency modules and for different carriers or bands (e.g., the number of multiple EHRs or SDCs could be a number of carriers or bands multiplied by a number of radio frequency modules). In another example relating to the second aspect, the UE may report multiple EHR or SDC for different carriers or bands associated with different radio frequency modules (e.g., the number of multiple EHRs or SDCs may be a number of carriers or bands).

In a further example relating to both the first and second aspects, the UE may report multiple EHR or SDC for multiple radio frequency modules (e.g., the number of multiple EHRs or SDCs may be a number of radio frequency modules). In case of SDC, the reference power for each SDC report may be a predefined or a preconfigured value.

In a further example relating to both the first and second aspects, the UE may report multiple EHR or SDC for multiple radio frequency modules (e.g., the number of multiple EHRs or SDCs may be a number of radio frequency modules). In case of SDC, the reference power for each SDC report may be a transmission power based on the PHR for a particular carrier or band.

FIG. 4E is an example communications diagram 450 over time between two network entities supporting dual connectivity. Specifically, the available energy corresponding to an EHR or SDC may be reported for NR-DC. Similar to uplink carrier aggregation, for NR-DC, the available energy in sub-6 GHz or in above-6 GHz may be restricted by SAR or PD limits. Unlike uplink carrier aggregation, there may be two gNB schedulers for NR-DC, one for master cell group (MCG) and the other for secondary cell group (SCG). If there are carriers or bands belonging to MCG and SCG, the power sharing between MCG and SCG may be handled.

In a first implementation, energy may be split into cell groups (CGs) and then EHR(s)/SDC(s) for each CG is computed and reported. The split ratio may be signaled by the network to the UE using RRC configuration. A master gNB (MgNB) and a secondary gNB (SgNB) may share and negotiate the split ratio via backhaul, and then inform the ratio to the UE. In a second implementation, energy may not be split into CGs and EHR(s)/SDC(s) is/are computed in the same way as for carrier aggregation. Then, the UE may report the EHR(s)/SCG(s) towards both MgNB and SgNB. MgNB and SgNB can share and negotiate the split ratio via backhaul, without informing the ratio to the UE.

In a first example 452, the MgNB may transmit a split ratio request to an SgNB. The SgNB may then transmit an acknowledgement or request for another ratio to the MgNB. In a second example 454, the SgNB may transmit a split ratio request to an MgNB. The MgNB may then transmit an acknowledgement or request for another ratio to the SgNB.

Turning now to FIGS. 5 and 6, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1A-B, 2, 4A-E and/or 7, as described herein, a specially-programmed processor, a processor executing specially-programmed software or computer-readable media, or by any other combination of a hardware component and/or a software component capable of performing the described actions or functions.

FIG. 5 illustrates a flow chart of an example of a method 500 for wireless communication at a UE, such as the first network entity 104. In an example, a UE 104 can perform the functions described in method 500 using one or more of the components described in FIGS. 1, 2, 4A-4E, and 7. It should be noted that the dashed-line boxes in FIG. 5 indicate optional actions.

At block 502, the method 500 may identify an available energy or available time period for an uplink transmission via uplink carrier aggregation or dual connectivity. In an aspect, the communicating component 342, e.g., in conjunction with processor(s) 312, memory 316, and/or transceiver 302, may be configured to identify an available energy or available time period for an uplink transmission via uplink carrier aggregation or dual connectivity. Thus, the UE 104, the processor(s) 312, the communicating component 342 or one of its subcomponents may define the means for identifying an available energy or available time period for an uplink transmission via uplink carrier aggregation or dual connectivity. For example, the UE 104 may identify the available or remaining energy corresponding to an energy or power headroom that can be allocated for uplink transmissions or time information indicating that the UE can sustain the transmission with a certain power.

In some aspects, identifying the available energy or available time period may include allocating the available time period between two or more uplink carriers or bands in a frequency range.

In some aspects, the available energy may correspond to a total available energy over multiple uplink carriers or bands in a frequency range.

In some aspects, the available time period may correspond to a total available time over multiple uplink carriers or bands in a frequency range.

In some aspects, the available time period may correspond to a total available time over one uplink carrier or band in a frequency range.

In some aspects, the total available time period may be based on a transmit power for the one uplink carrier or band.

In some aspects, identifying the available energy or the available time period includes receiving, via an RRC configuration message, an allocation ratio for allocating the available energy or available time period into cell groups, and allocating the available energy or available time period into cell groups.

In some aspects, the available energy may correspond to an accumulation of transmit power over a time period.

In some aspects, the available time may correspond to a duration that the UE can sustain transmission with a transmit power.

At block 504, the method 500 may transmit, to a network entity, a report including the available energy or available time period for uplink transmission. In an aspect, the communicating component 342, e.g., in conjunction with processor(s) 312, memory 316, and/or transceiver 302, may be configured to transmit, to a network entity, a report including the available energy or available time period for uplink transmission. Thus, the UE 104, the processor(s) 312, the communicating component 342 or one of its subcomponents may define the means for transmitting, to a network entity, a report including the available energy or available time period for uplink transmission. For example, the UE 104 may transmit, via the transceiver 302 and RF front end 388, to a network entity such base station 102, a report that includes the available energy or available time period for uplink transmission.

In some aspects, the report may include an available energy of each uplink carrier or band for uplink carrier aggregation.

In some aspects, transmitting the report may include transmitting a first report including an available energy of a first uplink carrier or band for uplink carrier aggregation, and transmitting a second report including an available energy of a second uplink carrier or band for uplink carrier aggregation.

In some aspects, the report may include an available time period for sustaining transmission with a defined transmission power.

In some aspects, transmitting the report may include transmitting a first report including an available time period of a first uplink carrier or band for uplink carrier aggregation, and transmitting a second report including an available time period of a second uplink carrier or band for uplink carrier aggregation.

In some aspects, transmitting the report may include transmitting, in a PUSCH, the total available time period over one uplink carrier or band and a power headroom report.

In some aspects, the power headroom report is associated with at least one of a PCell, a lowest serving cell index, a semi-statically configured carrier or band, or a carrier or band having an uplink transmission.

In some aspects, the report may include a total number of radio frequency components and an association of each radio frequency component to a different carrier or band.

In some aspects, transmitting the report may include transmitting a first report including available energy or available time period for a first radio frequency component, and transmitting a second report including available energy or available time period for a second radio frequency component.

In some aspects, transmitting the report may include transmitting two or more reports each including an available energy or an available time period of a single carrier or band associated with different radio frequency components and different carriers or bands.

In some aspects, transmitting the report may include transmitting two or more reports each including an available energy or an available time period of different carriers or bands associated with different radio frequency components.

At block 506, the method 500 may receive an uplink adjustment indication from the network entity based on transmitting the report. In an aspect, the communicating component 342, e.g., in conjunction with processor(s) 312, memory 316, and/or transceiver 302, may be configured to receive an uplink adjustment indication from the network entity based on transmitting the report. Thus, the UE 104, the processor(s) 312, the communicating component 342 or one of its subcomponents may define the means for receiving an uplink adjustment indication from the network entity based on transmitting the report. For example, after transmitting the report, the UE 104 may receive, via the transceiver 302 and RF front end 388, the uplink adjustment indication from the network entity such as base station 102.

In some aspects, the uplink adjustment indication may include at least one of increasing uplink scheduling for the UE, reducing uplink scheduling for the UE, or removing new radio dual connectivity configuration.

The method 500 may further optionally include transmitting, on an uplink channel via multiple radio frequency components, data on a carrier or band, wherein the multiple radio frequency components correspond to at least one of antenna ports associated with different TCI states, multiple spatial filters, multiple antenna panels, or multiple uplink panels. In an aspect, the communicating component 342, e.g., in conjunction with processor(s) 312, memory 316, and/or transceiver 302, may be configured to transmit, on an uplink channel via multiple radio frequency components, data on a carrier or band. Thus, the UE 104, the processor(s) 312, the communicating component 342 or one of its subcomponents may define the means for transmitting, on an uplink channel via multiple radio frequency components, data on a carrier or band.

The method 500 may further optionally include transmitting, on an uplink channel via multiple radio frequency components, data on different carriers or bands. In an aspect, the communicating component 342, e.g., in conjunction with processor(s) 312, memory 316, and/or transceiver 302, may be configured to transmit, on an uplink channel via multiple radio frequency components, data on different carriers or bands. Thus, the UE 104, the processor(s) 312, the communicating component 342 or one of its subcomponents may define the means for transmitting, on an uplink channel via multiple radio frequency components, data on different carriers or bands.

FIG. 6 illustrates a flow chart of an example of a method 600 for wireless communication at a network entity. In an example, a base station 102 can perform the functions described in method 600 using one or more of the components described in FIGS. 1, 3, 4A-4E, and 7.

At block 602, the method 600 may transmit, to a UE, a configuration message to configure the UE with carrier aggregation or dual connectivity. In an aspect, the communicating component 242, e.g., in conjunction with processor(s) 212, memory 216, and/or transceiver 202, may be configured to receive a dynamic capability indication including transmit, to a UE, a configuration message to configure the UE with carrier aggregation or dual connectivity. Thus, the base station 102, the processor(s) 212, the communicating component 242 or one of its subcomponents may define the means for transmitting, to a UE, a configuration message to configure the UE with carrier aggregation or dual connectivity.

In some aspects, receiving the report may include receiving, in a PUSCH, the total available time period over one uplink carrier or band and a power headroom report.

At block 604, the method 600 may receive, from the UE, a report including the available energy or time for uplink transmission via carrier aggregation or dual connectivity. In an aspect, the communicating component 242, e.g., in conjunction with processor(s) 212, memory 216, and/or transceiver 202, may be configured to receive, from the UE, a report including the available energy or time for uplink transmission via carrier aggregation or dual connectivity. Thus, the base station 102, the processor(s) 212, the communicating component 242 or one of its subcomponents may define the means for receiving, from the UE, a report including the available energy or time for uplink transmission via carrier aggregation or dual connectivity.

In some aspects, the report may include an available energy of each uplink carrier or band for uplink carrier aggregation.

In some aspects, receiving the report may include receiving a first report including an available energy of a first uplink carrier or band for uplink carrier aggregation, and receiving a second report including an available energy of a second uplink carrier or band for uplink carrier aggregation.

The method 600 may optionally further include identifying a total available energy based on the first report and the second report, wherein the total available energy is associated with a frequency range. In an aspect, the communicating component 242, e.g., in conjunction with processor(s) 212, memory 216, and/or transceiver 202, may be configured to identify a total available energy based on the first report and the second report, wherein the total available energy is associated with a frequency range. Thus, the base station 102, the processor(s) 212, the communicating component 242 or one of its subcomponents may define the means for identifying a total available energy based on the first report and the second report, wherein the total available energy is associated with a frequency range.

In some aspects, the report may include an available time period for sustaining transmission with a defined transmission power.

In some aspects, receiving the report may include receiving a first report including an available time period of a first uplink carrier or band for uplink carrier aggregation, and receiving a second report including an available time period of a second uplink carrier or band for uplink carrier aggregation.

The method 600 may optionally further include identifying a total available time period based on the first report and the second report, wherein the total available time period is associated with a frequency range. In an aspect, the communicating component 242, e.g., in conjunction with processor(s) 212, memory 216, and/or transceiver 202, may be configured to identify a total available time period based on the first report and the second report, wherein the total available time period is associated with a frequency range. Thus, the base station 102, the processor(s) 212, the communicating component 242 or one of its subcomponents may define the means for identifying a total available time period based on the first report and the second report, wherein the total available time period is associated with a frequency range.

In some aspects, the available energy may correspond to a total available energy over multiple uplink carriers or bands in a frequency range.

In some aspects, the available time period may correspond to a total available time over multiple uplink carriers or bands in a frequency range.

In some aspects, the available time period may correspond to a total available time over one uplink carrier or band in a frequency range.

In some aspects, the total available time period may be based on a transmit power for the one uplink carrier or band.

In some aspects, the available energy may correspond to an accumulation of transmit power over a time period.

In some aspects, the available time may correspond to a duration that the UE can sustain transmission with a transmit power.

At block 606, the method 600 may transmit a grant for the set of reference signals for the UE to perform the beam weight estimation. In an aspect, the communicating component 242, e.g., in conjunction with processor(s) 212, memory 216, and/or transceiver 202, may be configured to transmit a grant for the set of reference signals for the UE to perform the beam weight estimation. Thus, the base station 102, the processor(s) 212, the communicating component 242 or one of its subcomponents may define the means for transmitting a grant for the set of reference signals for the UE to perform the beam weight estimation.

In some aspects, adjusting the uplink communication with the UE includes at least one of increasing uplink scheduling for the UE, reducing uplink scheduling for the UE, or removing new radio dual connectivity configuration.

The method 600 may optionally further include communicating, with a different network entity, an allocation ratio for allocating the available energy or available time period, and transmitting, via an RRC configuration message, the allocation ratio to the UE. In an aspect, the communicating component 242, e.g., in conjunction with processor(s) 212, memory 216, and/or transceiver 202, may be configured to communicate, with a different network entity, an allocation ratio for allocating the available energy or available time period, and transmit, via an RRC configuration message, the allocation ratio to the UE. Thus, the base station 102, the processor(s) 212, the communicating component 242 or one of its subcomponents may define the means for communicating, with a different network entity, an allocation ratio for allocating the available energy or available time period, and transmitting, via an RRC configuration message, the allocation ratio to the UE.

The method 600 may optionally further include communicating, with a different network entity, an allocation ratio for allocating the available energy or available time period based on the received report. In an aspect, the communicating component 242, e.g., in conjunction with processor(s) 212, memory 216, and/or transceiver 202, may be configured to communicate, with a different network entity, an allocation ratio for allocating the available energy or available time period based on the received report. Thus, the base station 102, the processor(s) 212, the communicating component 242 or one of its subcomponents may define the means for communicating, with a different network entity, an allocation ratio for allocating the available energy or available time period based on the received report.

Figure 7:
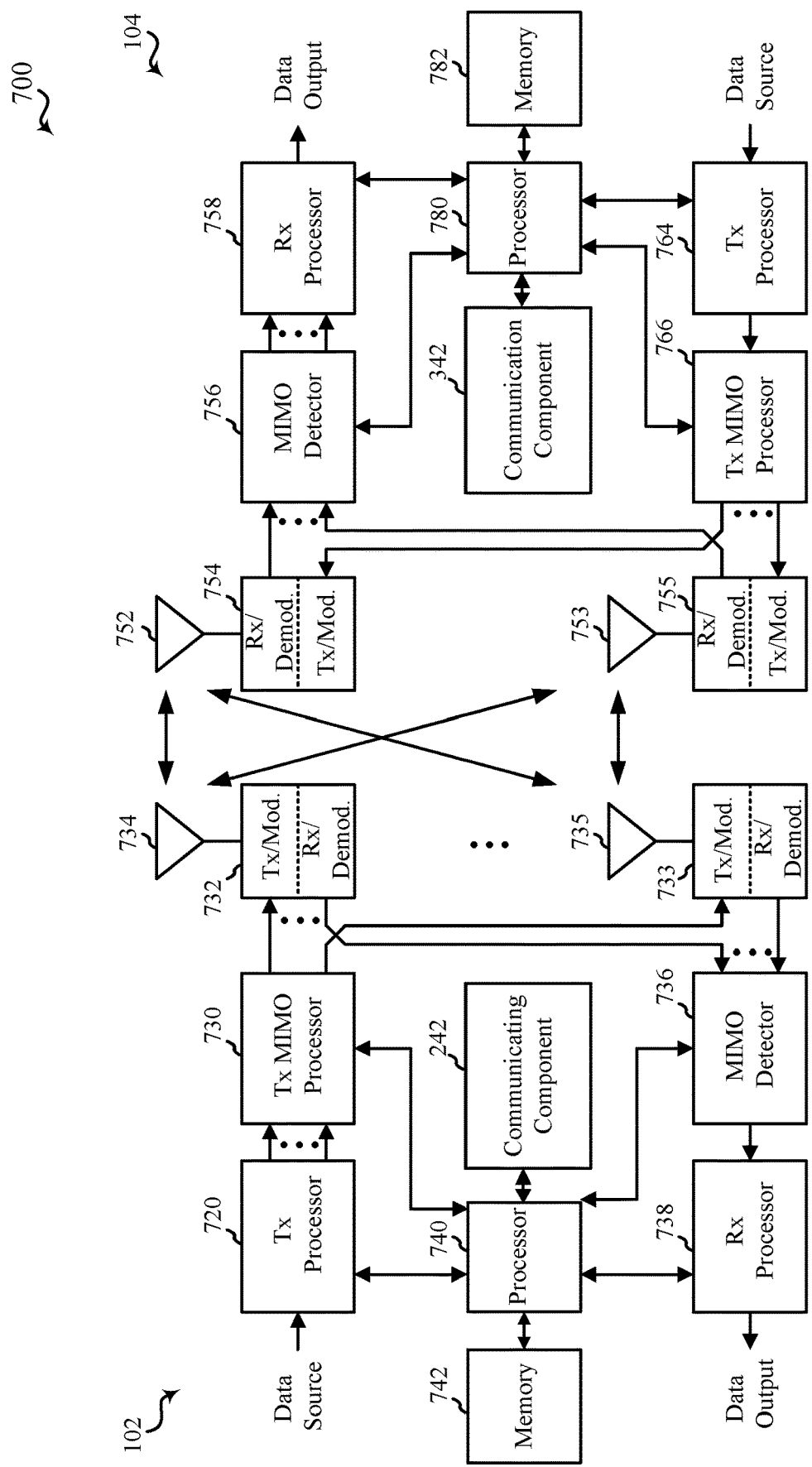
FIG. 7 is a block diagram illustrating an example of a MIMO communication system including a base station and a UE, in accordance with various aspects of the present disclosure.

FIG. 7 is a block diagram of a MIMO communication system 700 including a base station 102, which may be acting as a network device, and a UE 104. The MIMO communication system 900 may illustrate aspects of the wireless communication access network 100 described with reference to FIGS. 1A-B. The base station 102 may be an example of aspects of the base station 102 and/or base station 201 described with reference to FIG. 1A-B. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 980, or memory 982.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

SOME ADDITIONAL EXAMPLES

The aspects described herein additionally include one or more of the following aspect examples described in the following numbered clauses.

1. A method of wireless communication at a user equipment (UE), comprising:
   identifying an available energy or available time period for an uplink transmission via uplink carrier aggregation or dual connectivity; and
   transmitting, to a network entity, a report including the available energy or available time period for uplink transmission.

2. The method of clause 1, wherein the report includes an available energy of each uplink carrier or band for uplink carrier aggregation.

3. The method of clause 1 to clause 2, wherein transmitting the report includes:
   transmitting a first report including an available energy of a first uplink carrier or band for uplink carrier aggregation; and
   transmitting a second report including an available energy of a second uplink carrier or band for uplink carrier aggregation.

4. The method of clause 1 to clause 3, further comprising allocating the available energy between two or more uplink carriers or bands in a frequency range.

5. The method of clause 1 to clause 4, wherein the report includes an available time period for sustaining transmission with a defined transmission power.

6. The method of clause 1 to clause 5, wherein transmitting the report includes:
   transmitting a first report including an available time period of a first uplink carrier or band for uplink carrier aggregation; and
   transmitting a second report including an available time period of a second uplink carrier or band for uplink carrier aggregation.

7. The method of clause 1 to clause 6, further comprising allocating the available time period between two or more uplink carriers or bands in a frequency range.

8. The method of clause 1 to clause 7, wherein the available energy corresponds to a total available energy over multiple uplink carriers or bands in a frequency range.

9. The method of clause 1 to clause 8, wherein the available time period corresponds to a total available time over multiple uplink carriers or bands in a frequency range.

10. The method of clause 1 to clause 9, wherein the available time period corresponds to a total available time over one uplink carrier or band in a frequency range.

11. The method of clause 10, wherein the total available time period is based on a transmit power for the one uplink carrier or band.

12. The method of clause 10, wherein transmitting the report includes transmitting, in a physical uplink shared channel (PUSCH), the total available time period over one uplink carrier or band and a power headroom report.

13. The method of clause 12, wherein the power headroom report is associated with at least one of:
   a primary cell (PCell),
   a lowest serving cell index,
   a semi-statically configured carrier or band, or
   a carrier or band having an uplink transmission.

14. The method of clause 1 to clause 13, further comprising transmitting, on an uplink channel via multiple radio frequency components, data on a carrier or band, wherein the multiple radio frequency components correspond to at least one of antenna ports associated with different transmission configuration indication (TCI) states, multiple spatial filters, multiple antenna panels, or multiple uplink panels.

15. The method of clause 1 to clause 14, further comprising transmitting, on an uplink channel via multiple radio frequency components, data on different carriers or bands.

16. The method of clause 1 to clause 15, wherein the report indicates a total number of radio frequency components and an association of each radio frequency component to a different carrier or band.

17. The method of clause 1 to clause 16, wherein transmitting the report includes:
   transmitting a first report including available energy or available time period for a first radio frequency component; and
   transmitting a second report including available energy or available time period for a second radio frequency component.

18. The method of clause 1 to clause 17, wherein transmitting the report includes transmitting two or more reports each including an available energy or an available time period of a single carrier or band associated with different radio frequency components and different carriers or bands.

19. The method of clause 1 to clause 18, wherein transmitting the report includes transmitting two or more reports each including an available energy or an available time period of different carriers or bands associated with different radio frequency components.

20. The method of clause 1 to clause 19, wherein identifying the available energy or the available time period includes:
   receiving, via an radio resource control (RRC) configuration message, an allocation ratio for allocating the available energy or available time period into cell groups; and
   allocating the available energy or available time period into cell groups.

21. The method of clause 1 to clause 20, wherein the available energy corresponds to an accumulation of transmit power over a time period.

22. The method of clause 1 to clause 21, wherein the available time corresponds to a duration that the UE can sustain transmission with a transmit power.

23. A method of wireless communication at a network entity, comprising:
   transmitting, to a user equipment (UE), a configuration message to configure the UE with carrier aggregation or dual connectivity;
   receiving, from the UE, a report including the available energy or time for uplink transmission via carrier aggregation or dual connectivity; and
   adjusting uplink communication with the UE based on the received report.

24. The method of clause 23, wherein the report includes an available energy of each uplink carrier or band for uplink carrier aggregation.

25. The method of clause 23 to clause 24, wherein receiving the report includes:
   receiving a first report including an available energy of a first uplink carrier or band for uplink carrier aggregation; and
   receiving a second report including an available energy of a second uplink carrier or band for uplink carrier aggregation.

26. The method of clause 25, further comprising identifying a total available energy based on the first report and the second report, wherein the total available energy is associated with a frequency range.

27. The method of clause 23 to clause 26, wherein the report includes an available time period for sustaining transmission with a defined transmission power.

28. The method of clause 23 to clause 27, wherein receiving the report includes:
   receiving a first report including an available time period of a first uplink carrier or band for uplink carrier aggregation; and
   receiving a second report including an available time period of a second uplink carrier or band for uplink carrier aggregation.

29. The method of clause 28, further comprising identifying a total available time period based on the first report and the second report, wherein the total available time period is associated with a frequency range.

30. The method of clause 23 to clause 29, wherein the available energy corresponds to a total available energy over multiple uplink carriers or bands in a frequency range.

31. The method of clause 23 to clause 30, wherein the available time period corresponds to a total available time over multiple uplink carriers or bands in a frequency range.

32. The method of clause 23 to clause 31, wherein the available time period corresponds to a total available time over one uplink carrier or band in a frequency range.

33. The method of clause 32, wherein the total available time period is based on a transmit power for the one uplink carrier or band.

34. The method of clause 32, wherein receiving the report includes receiving, in a physical uplink shared channel (PUSCH), the total available time period over one uplink carrier or band and a power headroom report.

35. The method of clause 23 to clause 34, further comprising:
communicating, with a different network entity, an allocation ratio for allocating the available energy or available time period; and
transmitting, via an radio resource control (RRC) configuration message, the allocation ratio to the UE.

36. The method of clause 23 to clause 35, further comprising communicating, with a different network entity, an allocation ratio for allocating the available energy or available time period based on the received report.

37. The method of clause 23 to clause 36, wherein adjusting the uplink communication with the UE includes at least one of:
increasing uplink scheduling for the UE,
reducing uplink scheduling for the UE, or
removing new radio dual connectivity configuration.

38. The method of clause 23 to clause 37, wherein the available energy corresponds to an accumulation of transmit power over a time period.

39. The method of clause 23 to clause 38, wherein the available time corresponds to a duration that the UE can sustain transmission with a transmit power.

40. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in clause 1 to clause 22.

41. A non-transitory computer-readable medium, comprising code executable by one or more processors to perform the operations of one or more methods in clause 1 to clause 22.

42. An apparatus for wireless communication, comprising means for performing the operations of one or more methods in clause 1 to clause 22.

43. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in clause 23 to clause 39.

44. A non-transitory computer-readable medium, comprising code executable by one or more processors to perform the operations of one or more methods in clause 23 to clause 39.

45. An apparatus for wireless communication, comprising means for performing the operations of one or more methods in clause 23 to clause 39.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
    identifying an available energy or available time period for an uplink transmission via uplink carrier aggregation or dual connectivity, wherein identifying the available energy or available time period includes allocating the available energy or available time period between two or more uplink carriers or bands; and
    transmitting, to a network entity, a report including the available energy or available time period for uplink transmission.

2. The method of claim 1, wherein the report includes an available energy of each uplink carrier or band for uplink carrier aggregation.

3. The method of claim 1, wherein transmitting the report includes:
    transmitting a first report including an available energy of a first uplink carrier or band for uplink carrier aggregation; and
    transmitting a second report including an available energy of a second uplink carrier or band for uplink carrier aggregation.

4. The method of claim 1, wherein the available energy is allocated between the two or more uplink carriers or bands in a frequency range.

5. The method of claim 1, wherein the report includes an available time period for sustaining transmission with a defined transmission power.

6. The method of claim 1, wherein transmitting the report includes:
    transmitting a first report including an available time period of a first uplink carrier or band for uplink carrier aggregation; and
    transmitting a second report including an available time period of a second uplink carrier or band for uplink carrier aggregation.

7. The method of claim 1, wherein the available time period is allocated between the two or more uplink carriers or bands in a frequency range.

8. The method of claim 1, wherein the available energy corresponds to a total available energy over multiple uplink carriers or bands in a frequency range.

9. The method of claim 1, wherein the available time period corresponds to a total available time over multiple uplink carriers or bands in a frequency range.

10. The method of claim 1, wherein the available time period corresponds to a total available time over one uplink carrier or band in a frequency range.

11. The method of claim 10, wherein the total available time period is based on a transmit power for the one uplink carrier or band.

12. The method of claim 10, wherein transmitting the report includes transmitting, in a physical uplink shared channel (PUSCH), the total available time period over one uplink carrier or band and a power headroom report.

13. The method of claim 12, wherein the power headroom report is associated with at least one of:
    a primary cell (PCell),
    a lowest serving cell index,
    a semi-statically configured carrier or band, or
    a carrier or band having an uplink transmission.

14. The method of claim 1, further comprising transmitting data on an uplink channel via multiple radio frequency components on a carrier or band, wherein the multiple radio frequency components correspond to at least one of antenna ports associated with different transmission configuration indication (TCI) states, multiple spatial filters, multiple antenna panels, or multiple uplink panels.

15. The method of claim 1, further comprising transmitting, on an uplink channel via multiple radio frequency components, data on different carriers or bands.

16. The method of claim 1, wherein the report indicates a total number of radio frequency components and an association of each radio frequency component to a different carrier or band.

17. The method of claim 1, wherein transmitting the report includes:
    transmitting a first report including available energy or available time period for a first radio frequency component; and
    transmitting a second report including available energy or available time period for a second radio frequency component.

18. The method of claim 1, wherein transmitting the report includes transmitting two or more reports each including an available energy or an available time period of a single carrier or band associated with different radio frequency components and different carriers or bands.

19. The method of claim 1, wherein transmitting the report includes transmitting two or more reports each including an available energy or an available time period of different carriers or bands associated with different radio frequency components.

20. The method of claim 1, wherein identifying the available energy or the available time period includes:

receiving, via an radio resource control (RRC) configuration message, an allocation ratio for allocating the available energy or available time period into cell groups; and allocating the available energy or available time period into cell groups.

21. The method of claim 1, wherein the available energy corresponds to an accumulation of transmit power over a time period.

22. The method of claim 1, wherein the available time corresponds to a duration that the UE can sustain transmission with a transmit power.

23. An apparatus for wireless communication, comprising:
a transceiver;
a memory configured to store instructions; and
at least one processor communicatively coupled with the transceiver and the memory, wherein the at least one processor is configured to:
identify an available energy or available time period for an uplink transmission via uplink carrier aggregation or dual connectivity, wherein to identify the available energy or available time period, the at least one processor is further configured to allocate the available energy or available time period between two or more uplink carriers or bands; and
transmit, to a network entity, a report including the available energy or available time period for uplink transmission.

24. The apparatus of claim 23, wherein the report includes an available energy of each uplink carrier or band for uplink carrier aggregation.

25. The apparatus of claim 23, wherein the available energy corresponds to a total available energy over multiple uplink carriers or bands in a frequency range, and wherein the available time period corresponds to a total available time over multiple uplink carriers or bands in a frequency range.

26. The apparatus of claim 23, wherein the available time period corresponds to a total available time over one uplink carrier or band in a frequency range.

27. The apparatus of claim 23, wherein the at least one processor is further configured to transmit, on an uplink channel via multiple radio frequency components, data on a carrier or band, wherein the multiple radio frequency components correspond to at least one of antenna ports associated with different transmission configuration indication (TCI) states, multiple spatial filters, multiple antenna panels, or multiple uplink panels.

28. The apparatus of claim 23, wherein to identify the available energy or the available time period, the at least one processor is further configured to:
receive, via an radio resource control (RRC) configuration message, an allocation ratio for allocating the available energy or available time period into cell groups; and
allocate the available energy or available time period into cell groups.

29. An apparatus for wireless communication, comprising:
means for identifying an available energy or available time period for an uplink transmission via uplink carrier aggregation or dual connectivity, wherein identifying the available energy or available time period includes allocating the available energy or available time period between two or more uplink carriers or bands; and
means for transmitting, to a network entity, a report including the available energy or available time period for uplink transmission.

30. A non-transitory computer-readable medium including code executable by at least one processor to:
identify an available energy or available time period for an uplink transmission via uplink carrier aggregation or dual connectivity, wherein identifying the available energy or available time period includes allocating the available energy or available time period between two or more uplink carriers or bands; and
transmit, to a network entity, a report including the available energy or available time period for uplink transmission.

* * * * *